United States Patent
Miro et al.

(10) Patent No.: US 7,841,821 B2
(45) Date of Patent: Nov. 30, 2010

(54) TILTABLE HAULING DEVICE

(75) Inventors: Carlos E. Miro, Pembroke Pines, FL (US); Andrew Miro, Thornton, CO (US)

(73) Assignee: Mirofam LLC, Thornton, CO (US)

( * ) Notice: Subject to any disclaimer, the term of this patent is extended or adjusted under 35 U.S.C. 154(b) by 333 days.

(21) Appl. No.: 12/058,485

(22) Filed: Mar. 28, 2008

(65) Prior Publication Data

US 2008/0240897 A1    Oct. 2, 2008

Related U.S. Application Data

(60) Provisional application No. 60/908,851, filed on Mar. 29, 2007.

(51) Int. Cl.
*B60P 9/00* (2006.01)
*B60R 7/00* (2006.01)

(52) U.S. Cl. ............ 414/462; 414/537; 224/504; 224/506; 224/509; 224/524; 410/7

(58) Field of Classification Search .......... 14/69.5; 224/504, 506, 526; 296/50, 61; 414/462, 414/537
See application file for complete search history.

(56) References Cited

U.S. PATENT DOCUMENTS

| 3,058,636 | A | * | 10/1962 | Bilbeisi | 224/492 |
| 3,757,972 | A | * | 9/1973 | Martin | 414/537 |
| 4,275,981 | A | * | 6/1981 | Bruhn | 414/462 |
| 5,494,393 | A | * | 2/1996 | Schrunk | 414/537 |
| 6,139,247 | A | * | 10/2000 | Wright | 414/462 |
| 6,685,421 | B1 | * | 2/2004 | Reeves | 414/462 |
| 6,783,315 | B1 | * | 8/2004 | Senechal | 414/462 |
| 2001/0031193 | A1 | * | 10/2001 | Chevrier | 414/522 |
| 2008/0206031 | A1 | * | 8/2008 | Butta | 414/462 |

OTHER PUBLICATIONS

Webpage: ATV Solutions, Tilt-a-Rack Transporters, available at http:\\atvsolutions.com/scooter_carrier.html on Jul. 12, 2003.*

* cited by examiner

*Primary Examiner*—Gregory W Adams

(57) ABSTRACT

The present invention relates to a light-weight tiltable hauling device for transporting smaller, auxiliary vehicles, where such device mounts to the hitch of an automobile, truck, van, SUV, RV, or other similar motor vehicles, the device can be mounted and removed by a single individual, the auxiliary vehicle can be easily loaded and unloaded by a single individual, and the device can transport auxiliary vehicles weighing up to 700 pounds.

4 Claims, 7 Drawing Sheets

TILTABLE HAULING DEVICE

This application claims priority to U.S. Provisional Patent Application Ser. No. 60/908,851, filed Mar. 29, 2007; the aforementioned application is incorporated herein by reference.

FIELD OF INVENTION

This invention relates generally to transporting devices that can be removably mounted to automotive vehicles for the transport of auxiliary vehicles, such as recreational all-terrain vehicles (ATV's), lawn mowers, lawn tractors, mobility carriers, go-carts, motorcycles, bicycles, and the like.

BACKGROUND OF INVENTION

Recent developments in human auxiliary transportation systems, both for general assisted mobility applications and for recreational and emergency off-road applications, have lead to the development of various three and four-wheel vehicles, typically smaller in size than an automobile, which are designed to transport one or two persons off-road for relatively long distances over rough terrain into remote areas. Such vehicles are commonly known as all-terrain vehicles or ATV's and are known in the art. ATV's are used routinely by hunters, fishermen, forest service employees and law enforcement agencies for transportation into the national forests and other public lands where access by conventional motor vehicles is impossible. In addition, ATVs find wide application in the agricultural and ranching industries where they are used by farmers and ranchers in livestock round-ups, feed delivery, fence mending and other maintenance activities which are undertaken in off-road areas.

In the health care field, three and four-wheel motorized conveyance devices, commonly known as mobility scooters or mobility carriers, have been developed to assist patients recovering from various types of mobility-limiting injuries, the elderly and the handicapped in getting out and about in their daily activities. Such devices also include motorized wheel chairs adapted to transport people and their required health care apparatus, oxygen tanks and crutches, by way of example, from parking lots into stores, shopping malls and along sidewalks for routine outings in recreation situations.

While some models of motorized devices used in the health care field are sufficiently small and light to be transported in the trunk or back seat of an automobile, many of the aforementioned vehicles, particularly the recreational ATV's, are commonly transported in vans, pickup trucks or on trailers; inasmuch as some of the larger four and six-wheel designs, can weigh up to 700 pounds. Loading and unloading heavy ATV's from the bed of a pickup truck, a van or a trailer typically requires the use of a ramp and often more than one individual to assist in the operation. Moreover, the ramp itself, may be heavy and cumbersome to move and position and takes up additional space in the vehicle, thereby limiting space that would otherwise be available for storage of other gear. Accordingly, a need has arisen for a lightweight and easily maneuverable and operable means of transporting motorized conveyance vehicles for use in health care, agricultural, off-road recreational, law enforcement and similar applications where the auxiliary vehicle, ATV, lawn care implement, and the like, may be transported from its storage area to another location and off-loaded for use.

Various vehicle-mounted carrying racks have been devised to address the foregoing requirements and are known in the art. Such racks may be removably attached to the rear trailer hitch receiver of an automobile, pickup truck or sport utility vehicle (SUV) so equipped. One such carrying rack is disclosed in U.S. Pat. No. 6,139,247 issued Oct. 31, 2000 to Wright, and other prior art devices of similar construction and application are disclosed in the patents cited therein. While the Wright device disclosed in the '247 patent has experienced considerable commercial success, it has been found that the overall weight, size, and shape of the disclosed system are such that a single individual, especially a person of slender build or who has physical limitations may not be able to mount the apparatus on a motor vehicle or load and unload their ATV's onto the carrier without the assistance of others. This is particularly disadvantageous for individuals who live alone or who live in remote areas, where assistance is not readily available. Accordingly, a need clearly exists for a lightweight, auxiliary vehicle carrier which may be removably mounted to a motor vehicle by a single individual without the assistance of others and which may be used to load, transport and unload ATV's and other types of auxiliary vehicles by an individual user.

SUMMARY OF INVENTION

The present invention relates to a tiltable hauling device for transporting auxiliary vehicles, where such device mounts to the hitch of an automobile, truck, van, SUV, RV, or other similar motor vehicles.

An object of this invention is to provide a hauling device that is made of a light-weight material so that it can be mounted by a single individual but can still transport auxiliary vehicles weighing up to 700 lbs.

A further object of this invention is to provide a hauling device that tilts downward for loading and unloading of auxiliary vehicles to eliminate the need for separate ramps and to make it possible for a single individual to load and unload an auxiliary vehicle.

A further object is to provide a slideably attached deck extender to reduce the angle of incline for loading or unloading an auxiliary vehicle.

A further object is to provide a solid, light-weight deck on which the auxiliary vehicle will ride during transportation, and for protecting the auxiliary vehicle from dirt, water, and other road debris.

A further object is to provide a rotatably attached end gate to help secure the auxiliary vehicle onto the hauling device, whereby such end gate will rotate downward to allow for the auxiliary vehicle to be loaded and unloaded, thereby, allowing the deck extender to be extended and retracted without interference by the end gate.

A further object is to provide means for locking both the end gate in the up position and the deck extender in the retracted position for transportation of the auxiliary vehicle.

A further object of the invention is to provide means for rotating the hauling device into a storage position when no auxiliary vehicle is being transported.

DESCRIPTION OF INVENTION

Before proceeding with the detailed description, it is to be appreciated that the present teaching is by way of example, not by limitation. The concepts herein are not limited to use or application with one specific embodiment of a tiltable hauling device. Thus, although steps and processes described herein are for the convenience of explanation, shown and described with respect to exemplary embodiments, the principles herein may be equally applied in other embodiments.

Figure 1:
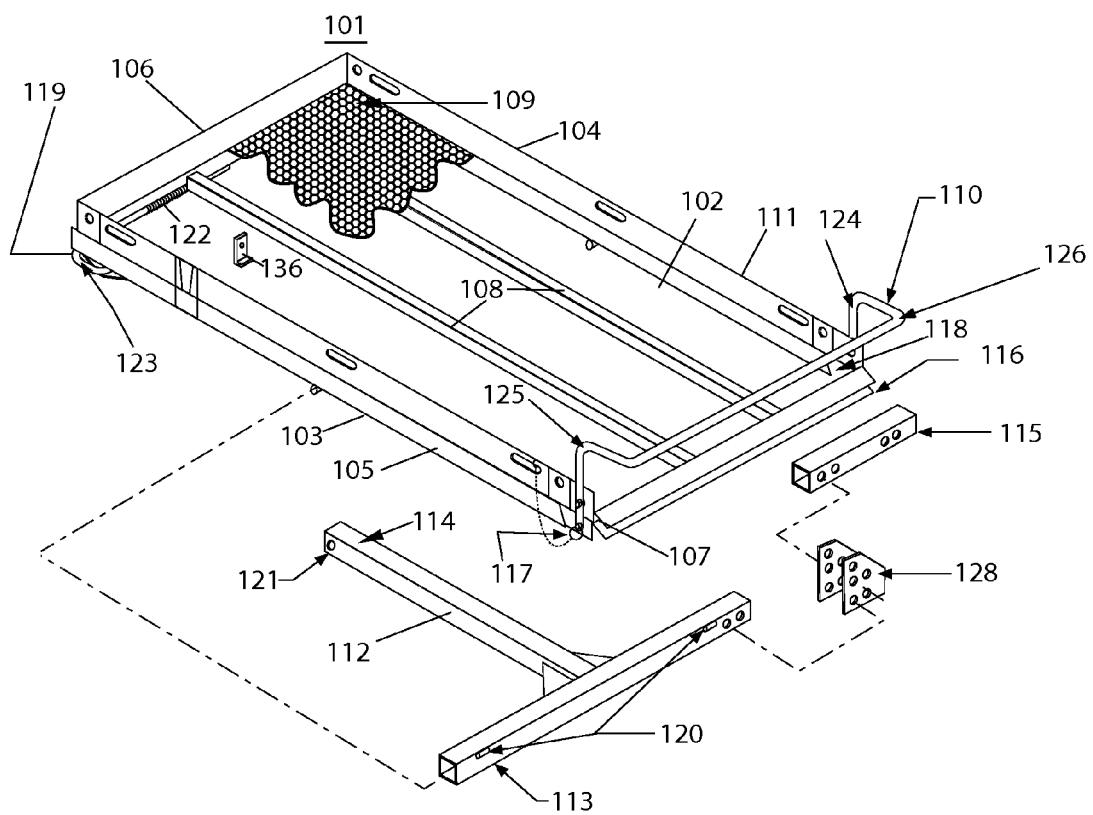
FIG. 1 is a perspective view of one embodiment of the invention for use as a mobility or ATV carrier.

Referring now to FIG. 1, one embodiment of the tiltable hauling device is shown generally at 100. The device shown is designed to be hitched to a transporting vehicle for use in transporting small auxiliary vehicles, such as mobility carriers, ATV's, lawn mowers, and golf carts weighing up to 500 lbs. Transporting vehicles may include automobiles, trucks, vans, SUVs, RVs, or other similar motor vehicles. The hauling device includes a carrying rack 101 with a top 102, bottom 103, front 104, rear 105, left end 106 and right end 107. The bottom 103 of the carrying rack 101 comprises a plurality of support beams 108 that run from the left end 106 to the right end 107 of the carrying rack 101. The left end 106 of the carrying rack 101 is at the driver's side of the transporting vehicle. The right end 107 is at the passenger side of the transporting vehicle.

The top 102 of said carrying rack 101 comprises a generally planar platform 109 of solid, light-weight material that is affixed to the support beams 108, and a rail 111 extending above the platform 109 along one of the left end 106 or right end 107 of the carrying rack 101 and along the front 104 and rear 105 of the carrying rack 101. The rail 111 forms an opening 118 at one of the left end 106 or right end 107 of the carrying rack 101 for loading and unloading said auxiliary vehicle. In the embodiment shown, the opening 118 is located at the right end 107, which is the passenger side of the transporting vehicle. In such an embodiment, the carrying rack 101 will tilt downward in a manner so that the auxiliary vehicle can be loaded or unloaded away from traffic.

In one embodiment as shown in FIG. 1, the front 104, rear 105, left end 106, and right end 107, which forms a frame for the platform 109, and the rail 111 may be manufactured from a single piece of extruded, light-weight material, such as aluminum. The use of extruded aluminum increases the overall strength of the carrying rack 101, reduces the amount of welding required for manufacturing, and improves the aesthetics of the carrying rack 101. However, it is to be understood that other materials and means of manufacturing the platform may be used without departing from the scope of this invention.

The embodiment shown in FIG. 1 also includes an outrigger 112 that comprises a main frame 113 and a level control arm 114. The main frame 113 extends below and in a direction substantially perpendicular to the support beams 108 between the front 104 to the rear 105 of the carrying rack 101. The main frame 113 is connected to the bottom 103 of the carrying rack 101 by a one or more hinges 120 located near the center line between the left end 106 and right end 107 of the carrying rack 101. The carrying rack 101 pivots at the hinges 120 along the axis of the main frame 113 so that the opening 118 will tilt downward into a loading position to allow an auxiliary vehicle to be loaded onto or unloaded from the carrying rack 101. FIG. 2c shows the carrying rack 101 in the loading position.

The level control arm 114 extends perpendicularly from the main frame 113 to the end opposite the opening 118, and extends parallel to and below the plurality of support beams 108. The bottom 103 of the carrying rack 101 rests upon the level control arm 114 when in a transport position as shown in FIG. 2a. This embodiment also includes means 119 for locking the carrying rack 101 to the level control arm 114 when the carrying rack 101 is in the transport position that is generally planar to the ground.

The preferred embodiment for the locking means 119 is a spring biased locking pin 122 extending along the left end 106 of the carrying rack 101 from the rear 105 into the level control arm 114. A handle 123 is located at one end of the locking pin 122 near the rear 105 of the carrying rack 101. A hole 121 is located in the level control arm 114 near the left end 106 of the carrying rack 101. Using the handle 123, the spring biased locking pin 122 can be retracted and then extended into the hole 121 in the level control arm 114 locking the carrying rack 101 in the transport position. Similarly, prior to loading or unloading an auxiliary vehicle, the locking pin 122 can be disengaged from the hole 121 in the level control arm 114, thereby allowing the carrying rack 101 to tilt toward the opening 118.

The embodiment shown in FIGS. 1 and 2 also includes a loading deck 116 located below the carrying rack 101 and above the outrigger 112. The loading deck 116 slides into a plurality of channels 127 located along the front 104 and rear 105 of the bottom 103 of the carrying rack 101. The loading deck 116 slides outwardly from the opening 118 to extend the platform 109 during loading and unloading of an auxiliary vehicle. The loading deck 116 when extended also reduces the angle of incline for loading and unloading, making it easier to load or unload auxiliary vehicles, especially on taller transporting vehicles. Means 136 for stopping the loading deck 116 when it is retracted under the carrying rack 101 is also included in the present embodiment.

Figure 2:
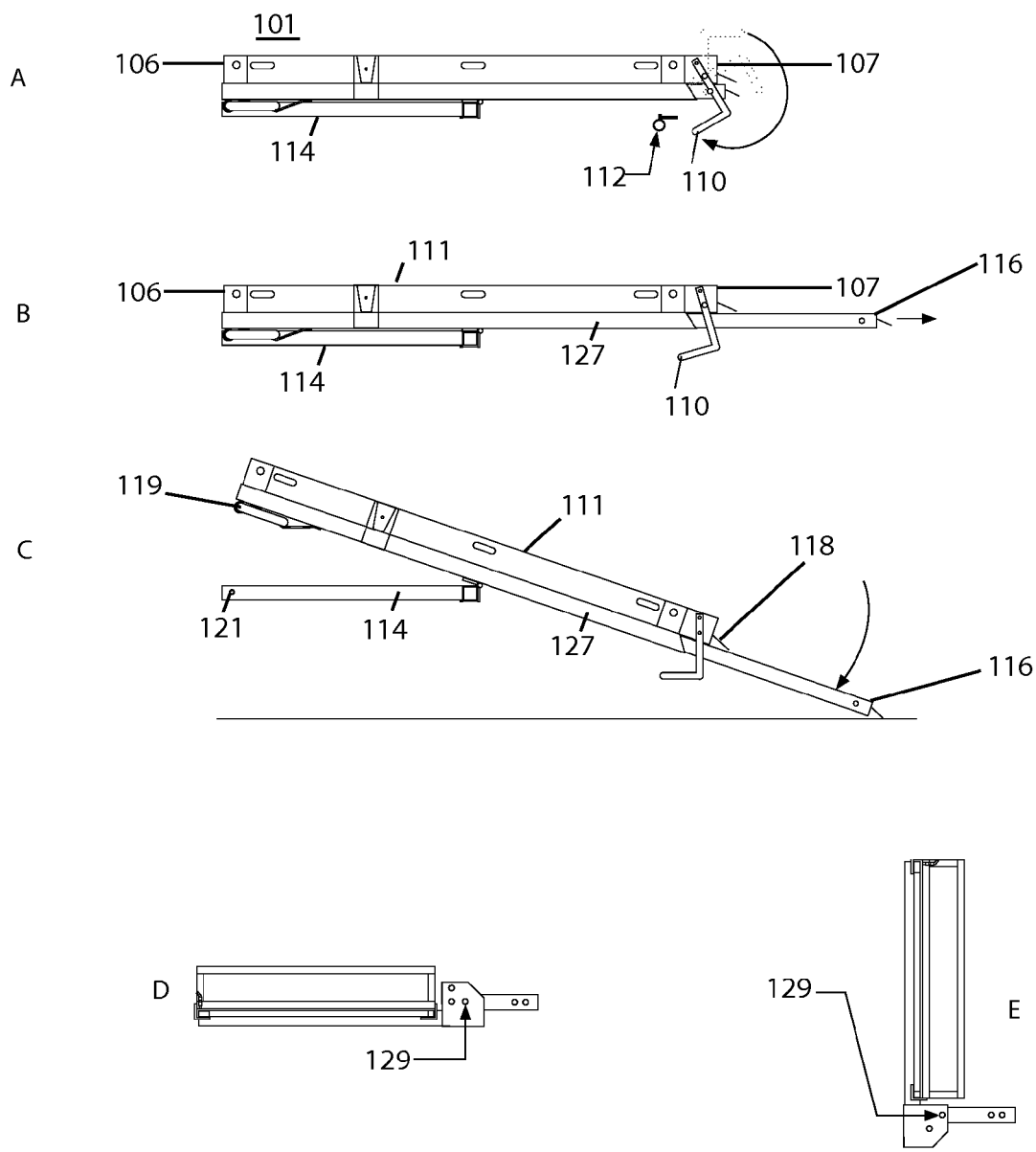
FIG. 2 shows the operation of the embodiment of the invention as shown in FIG. 1.

The embodiment shown in FIGS. 1 and 2 also includes an end bar 110 that is attached to the rails 111 near the opening 118. The end bar 110 has first and second side bars 124 and 125 and a cross bar 126. The first side bar 124 is attached to the rail 111 at the front 104 of the carrying rack 101 near the opening 118. The second side bar 125 is attached to the rail 111 at the rear 105 near the opening 118. The side bars 124 and 125 are pivotally attached to the rail 111 in a manner that allows the cross bar 126 to rotate downward and under the carrying rack 101 when the loading deck 116 is in the retracted position. This allows the loading and unloading of auxiliary vehicles. The rotation of the end bar 110 downward into a loading position is shown in FIG. 2a. The end bar 110 can also be rotated upward into a transporting position to prevent the auxiliary vehicle from rolling off the carrying rack 101 while being transported.

The embodiment shown in FIGS. 1 and 2 also includes means 117 for locking both the end bar 110 in a transport position and the loading deck 116 in a retracted position. This locking means 117 allows the user to unlock both the end gate 117 and the deck extender 116 simultaneously for loading and unloading of auxiliary vehicles.

FIGS. 1 and 2 also show a hitch bar 115 and a hitch bar connection block 128. The hitch bar 115 is connected to the main frame 113 using the connection block 128 and bolts or other similarly removable connection means. The hitch bar 115 is used to mount the tiltable hauling device 100 onto the transporting vehicle. In this embodiment, the hitch bar 115 is connected to the main frame 113 with a connection block 128 that allows the hauling device 100 to be rotated from a position generally planar to the ground to a storage position where the rear 105 of the carrying rack 101 is above the front 104 when no auxiliary vehicle is being transported. The transporting position for the carrying rack 101 is shown in FIG. 2d, and the storage position is shown in FIG. 2e. A locking pin 129 is used with the connection block 128 to lock the carrying rack 101 in the transport position or the storage position.

The carrying rack 101 shown in FIGS. 1 and 2 is constructed using a light-weight material, preferably aluminum, with the following preferred sizes, weights, capacities, and deck extensions to accommodate different sizes of auxiliary vehicles and yet maintain the desired light weight of the hauling device 100:

| Size | Weight | Capacity | Deck Extension |
| --- | --- | --- | --- |
| Width 24 inches Length 44 inches | Less than 50 pounds | Up to 350 pounds | 25 to 40 inches |
| Width 26 inches Length 52 inches | Less than 60 pounds | Up to 350 pounds | 30 to 48 inches |
| Width 32 inches Length 60 inches | Less than 85 pounds | Up to 500 pounds | 40 to 56 inches |
| Width 38 inches Length 63 inches | Less than 105 pounds | Up to 500 pounds | 45 to 59 inches |

The size refers to the usable size of the platform 109 with the width being the distance from the front 104 to the rear 105 and the length being the distance from the left end 106 to the right end 107. The weight refers to the weight of the hauling device 100. The capacity refers to the maximum weight of the auxiliary vehicle being transported using the hauling device 100. The deck extension refers to the distance that the loading deck 116 can be extended outward from the opening 118.

Figure 3:
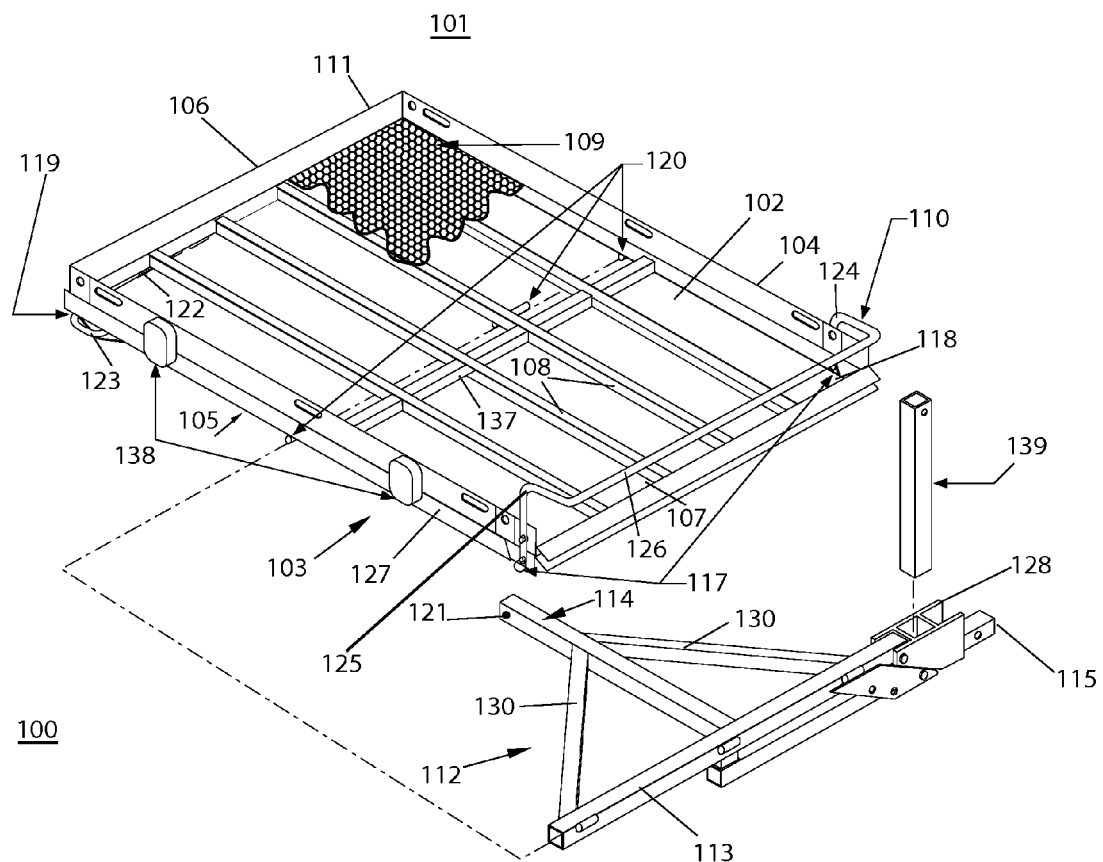
FIG. 3 is a perspective view of a second embodiment of the invention for use as a mobility or ATV carrier.

FIG. 3 shows an additional embodiment of the tiltable hauling device 100 to be hitched to a transporting vehicle for use in transporting small auxiliary vehicles, weighing up to 700 lbs.

FIG. 3 shows a carrying rack 101 with a top 102, bottom 103, front 104, rear 105, left end 106 and right end 107. The bottom 103 of the carrying rack 101 comprises a plurality of support beams 108 that run from the left end 106 to the right end 107 of the carrying rack 101. At least one transverse support beam 137 is included near the centerline between the left end 106 and the right end 107.

The top 102 of said carrying rack 101 comprises a generally planar platform 109 of solid, light-weight material that is affixed to the support beams 108, and a rail 111 extending above the platform 109 along one of the left end 106 or right end 107 of the carrying rack 101 and along the front 104 and rear 105 of the carrying rack 101. The rail 111 forms an opening 118 at one of the left end 106 or right end 107 of the carrying rack 101 for loading and unloading said auxiliary vehicle. In the embodiment shown, the opening 118 is located at the right end 107, which is the passenger side of the transporting vehicle. In such an embodiment, the carrying rack 101 will tilt downward in a manner so that the auxiliary vehicle can be loaded or unloaded away from traffic.

In one embodiment as shown in FIG. 3, the front 104, rear 105, left end 106, and right end 107, which forms a frame for the platform 109, and the rail 111 may be manufactured from a single piece of extruded, light-weight material, such as aluminum. The use of extruded aluminum increases the overall strength of the carrying rack 101, reduces the amount of welding required for manufacturing, and improves the aesthetics of the carrying rack 101. However, it is to be understood that other materials and means of manufacturing the platform may be used without departing from the scope of this invention.

The embodiment shown in FIG. 3 also includes an outrigger 112 that comprises a main frame 113, a level control arm 114, and a plurality of stabilizing yolks 130 to reinforce the outrigger to support larger auxiliary vehicles. The main frame 113 extends in a generally perpendicular direction below the support beams 108 between the front 104 and rear 105 of the carrying rack 101. The main frame 113 is connected to the bottom 103 of the carrying rack 101 by a one or more hinges 120 located near the center line between the left end 106 and right end 107 of the carrying rack 101. The carrying rack 101 pivots at the hinges 120 so that the opening 118 will tilt downward into a loading position to allow an auxiliary vehicle to be loaded onto or unloaded from the carrying rack 101. FIG. 4b shows the carrying rack 101 in the loading position.

The level control arm 114 extends in a generally perpendicular direction from the main frame 113 to the end opposite the opening 118, and extends parallel below the support beams 108. The bottom 103 of the carrying rack 101 rests upon the level control arm 114 when in a transport position as shown in FIG. 4a. This embodiment also includes means for locking 119 the carrying rack 101 to the level control arm 114 when the carrying rack 101 is in the transport position that is generally planar to the ground.

The preferred embodiment for the locking means 119 is a spring biased locking pin 122 extending along the left end 106 of the carrying rack 101 from the rear 105 into the level control arm 114. A handle 123 is located at one end of the locking pin 122 near the rear 105 of the carrying rack 101. A hole 121 is located in the level control arm 114 near the left end 106 of the carrying rack 101. Using the handle 123, the spring biased locking pin 122 can be retracted and then extended into the hole 121 in the level control arm 114 locking the carrying rack 101 in the transport position. Similarly, prior to loading or unloading an auxiliary vehicle, the locking pin 122 can be disengaged from the hole 121 in the level control arm 114 allowing the carrying rack 101 to tilt toward the opening 118.

The embodiment shown in FIG. 3 also includes a loading deck 116 located below the carrying rack 101 and above the outrigger 112. The loading deck 116 slides into a plurality of channels 127 located along the front 104 and rear 105 of the bottom 103 of the carrying rack 101. The loading deck 116 slides outward from the opening 118 to extend the platform 109 during loading and unloading of an auxiliary vehicle. The loading deck 116 when extended also reduces the angle of incline for loading and unloading, making it easier to load or unload auxiliary vehicles, especially on taller transporting vehicles.

Figure 4:
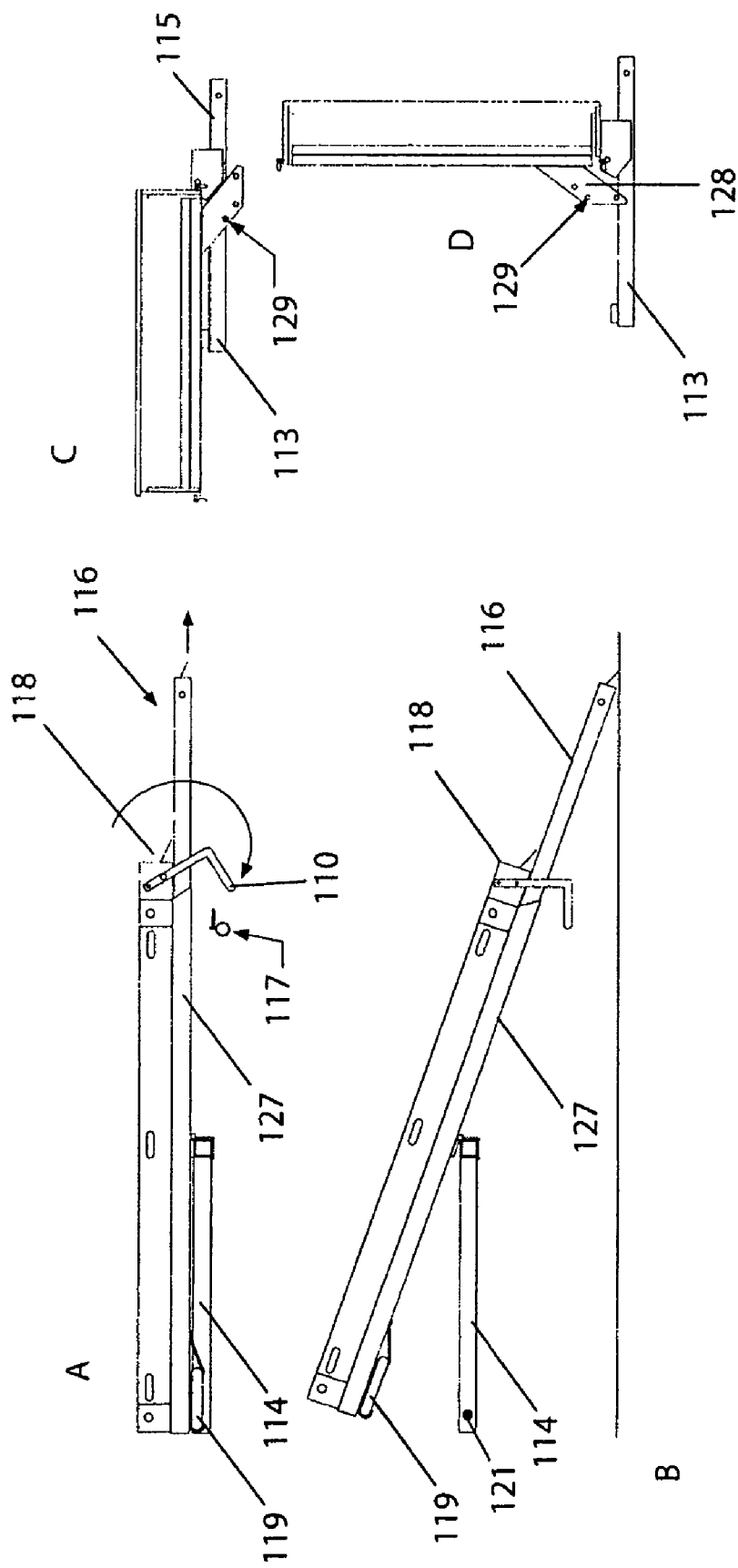
FIG. 4 shows the operation of the embodiment of the invention as shown in FIG. 3.

The embodiment shown in FIGS. 3 and 4 also includes an end bar 110 that is attached to the rails 111 near the opening 118. The end bar 110 has first and second side bars 124 and 125 and a cross bar 126. The first side bar 124 is attached to the rail 111 at the front 104 of the carrying rack 101 near the opening 118. The second side bar 125 is attached to the rail 111 at the rear 105 near the opening 118. The side bars 124 and 125 are attached to the rail 111 in a manner that allows the cross bar 126 to rotate downward and under the carrying rack 101 when the loading deck 116 is in the retracted position. This allows the loading and unloading of auxiliary vehicles. The rotation of the end bar 110 downward into a loading position is shown in FIG. 4a. The end bar 110 can also be rotated upward into a transporting position to prevent the auxiliary vehicle from rolling off the carrying rack 101 while being transported.

The embodiment shown in FIGS. 3 and 4 also includes a plurality of locking means 117 for locking both the end bar 110 in a transport position and the loading deck 116 into a retracted position for transporting an auxiliary vehicle. This plurality of locking means 117 for locking both the end bar 110 and the deck extender 116 allows the user to lock and unlock both the end bar 110 and the deck extender 116 at the same time.

FIGS. 3 and 4 also show a hitch bar 115 and a hitch bar connection block 128. The hitch bar 115 is connected to the main frame 113 using the connection block 128 and bolts or other similarly removable connection means. The hitch bar 115 overlaps the main frame 113 to provide additional support for transporting auxiliary vehicles weighing up to 700 pounds. The hitch bar 115 is used to mount the tiltable hauling device 100 onto the transporting vehicle. The connection block 128 allows the hauling device 100 to be rotated from a position generally planar to the ground to a storage position where the rear 105 of the carrying rack 101 is above the front 104 when no auxiliary vehicle is being transported. The transporting position for the carrying rack 101 is shown in FIG. 4c, and the storage position is shown in FIG. 4d. A locking pin 129 is used with the connection block 128 to lock the carrying rack 101 in the transport position or the storage position.

The embodiment shown in FIG. 3 includes a stabilizing bar 139 which is used to help strap down and stabilize oversized auxiliary vehicles during transport. This embodiment also includes tail lights 138 mounted on the rail 111 at the rear 105 of the carrying rack.

The carrying rack 101 shown in FIGS. 3 and 4 is constructed using a light-weight material, preferably aluminum, with the following preferred sizes, weights, capacities, and deck extensions to accommodate different sizes of auxiliary vehicles and yet maintain the desired light weight of the hauling device 100:

| Size | Weight | Capacity | Deck Extension |
| --- | --- | --- | --- |
| Width 49 inches Length 72 inches | Less than 120 pounds | Up to 700 pounds | Up to 34 inches |

The size refers to the usable size of the platform 109 with the width being the distance from the front 104 to the rear 105 and the length being the distance from the left end 106 to the right end 107. The weight refers to the weight of the hauling device 100. The capacity refers to the maximum weight of the auxiliary vehicle being transported using the hauling device 100. The deck extension refers to the distance that the loading deck 116 can be extended outward from the opening 118.

Figure 5:
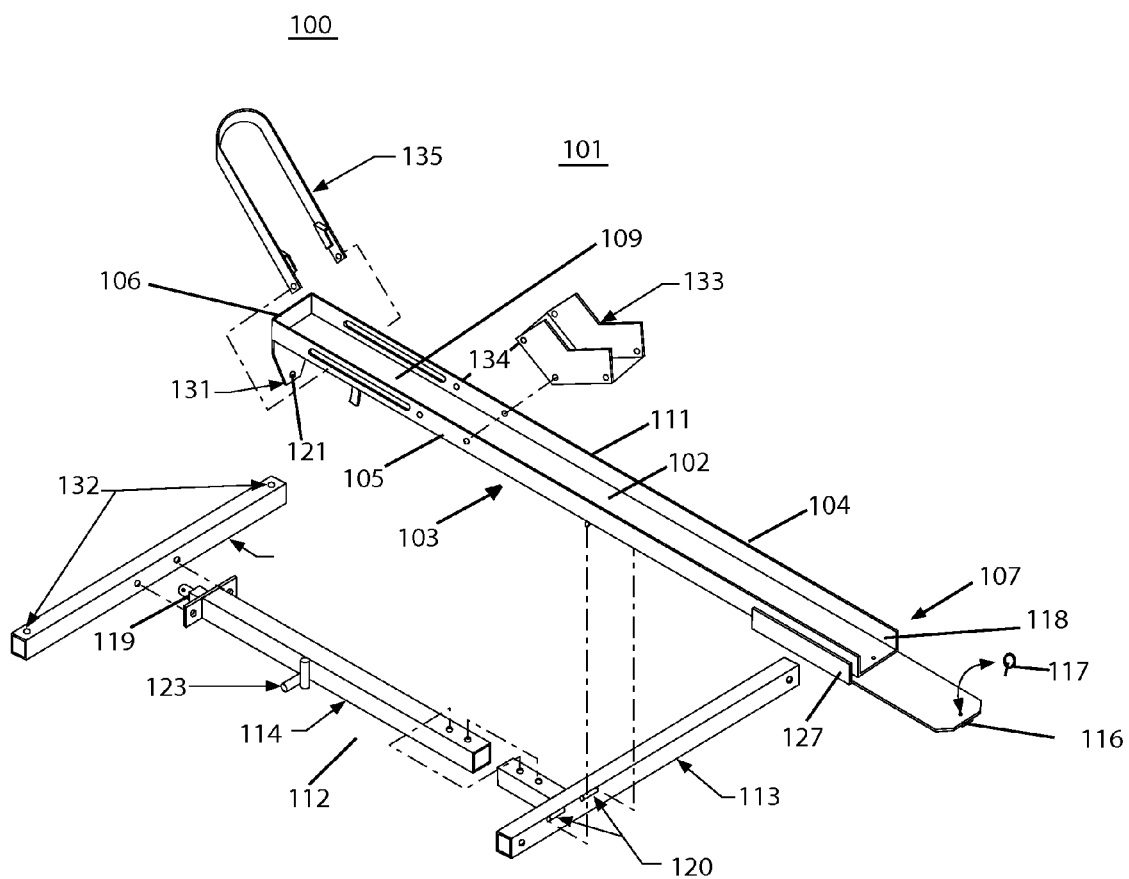
FIG. 5 is a perspective view of an embodiment of the invention for use as a motorcycle carrier.

FIG. 5 shows an embodiment of the tiltable hauling device 100 to be hitched to a transporting vehicle for use in transporting two-wheeled auxiliary vehicles, weighing up to 600 pounds.

FIG. 5 shows a carrying rack 101 with a top 102, bottom 103, front 104, rear 105, left end 106 and right end 107. The width of the carrying rack 101 from the front 104 to the rear 105 is wide enough to accommodate a two-wheeled auxiliary vehicle. In the preferred embodiment the width is between 6 and 8 inches.

The top 102 of said carrying rack 101 comprises a generally planar platform 109 of solid, light-weight material that is affixed to the support beams 108, and a rail 111 extending above the platform 109 along one of the left end 106 or right end 107 of the carrying rack 101 and along the front 104 and rear 105 of the carrying rack 101. The rail 111 forms an opening 118 at one of the left end 106 or right end 107 of the carrying rack 101 for loading and unloading said auxiliary vehicle. In the embodiment shown, the opening 118 is located at the right end 107, which is the passenger side of the transporting vehicle. In such an embodiment, the carrying rack 101 will tilt downward in a manner so that the auxiliary vehicle can be loaded or unloaded away from traffic.

In one embodiment as shown in FIG. 5, the platform 109 and the rail 111 may be manufactured from a single piece of extruded, light-weight material, such as aluminum. The use of extruded aluminum increases the overall strength of the carrying rack 101, reduces the amount of welding required for manufacturing, and improves the aesthetics of the carrying rack 101. However, it is to be understood that other materials and means of manufacturing the platform may be used without departing from the scope of this invention.

The embodiment shown in FIG. 5 also includes an outrigger 112 that comprises a main frame 113 and a level control arm 114. The main frame 113 extends below the bottom 103 of the carrying rack 101 and in a direction generally perpendicular to the front 104 and rear 105 of the carrying rack 101. The main frame 113 is connected to the bottom 103 of the carrying rack 101 by one or more hinges 120 located near the center line between the left end 106 and right end 107 of the carrying rack 101. The carrying rack 101 pivots at the hinges 120 so that the opening 118 will tilt downward into a loading position to allow an auxiliary vehicle to be loaded onto or unloaded from the carrying rack 101. FIG. 6b shows the carrying rack 101 in the loading position. FIG. 6a shows the carrying rack 101 in the transporting position. In this embodiment, the main frame 113 also serves as the hitch bar for mounting the hauling device 100 onto a transporting vehicle.

The level control arm 114 extends perpendicularly from the main frame 113 to the end opposite the opening 118, and extends below the bottom 103 of the carrying rack 101 so that the bottom 103 of the carrying rack 101 rests upon the level control arm 114 when in a transport position as shown in FIG. 6a. This embodiment also includes means for locking 119 the carrying rack 101 to the level control arm 114 when the carrying rack 101 is in the transport position that is generally planar to the ground.

The preferred embodiment for the locking means 119 is a spring biased locking pin 122 extending along the level control arm 114 to the left end 107 of the carrying rack 101 and a locking plate 131 located at the left end 107 of the carrying rack 101. A handle 123 is connected to the locking pin 122 and located along the level control arm 114. A hole 121 is located in the locking plate 131. Using the handle 123, the spring biased locking pin 122 can be retracted and then extended into the hole 121 in the locking plate 131 locking the carrying rack 101 in the transport position. Similarly, prior to loading or unloading an auxiliary vehicle, the locking pin 122 can be disengaged from the hole 121 allowing the carrying rack 101 to tilt toward the opening 118.

The embodiment shown in FIG. 5 also includes a loading deck 116 located below the carrying rack 101 and above the outrigger 112. The loading deck 116 slides into a channel 127 located along the bottom 103 of the carrying rack 101. The loading deck 116 slides outwardly from the opening 118 to extend the carrying rack 101 during loading and unloading of an auxiliary vehicle. The loading deck 116 when extended also reduces the angle of incline for loading and unloading, making it easier to load or unload auxiliary vehicles, especially on taller transporting vehicles. The shown embodiment also includes means 117 for locking the loading deck 116 in a retracted position for transporting a vehicle.

Figure 6:
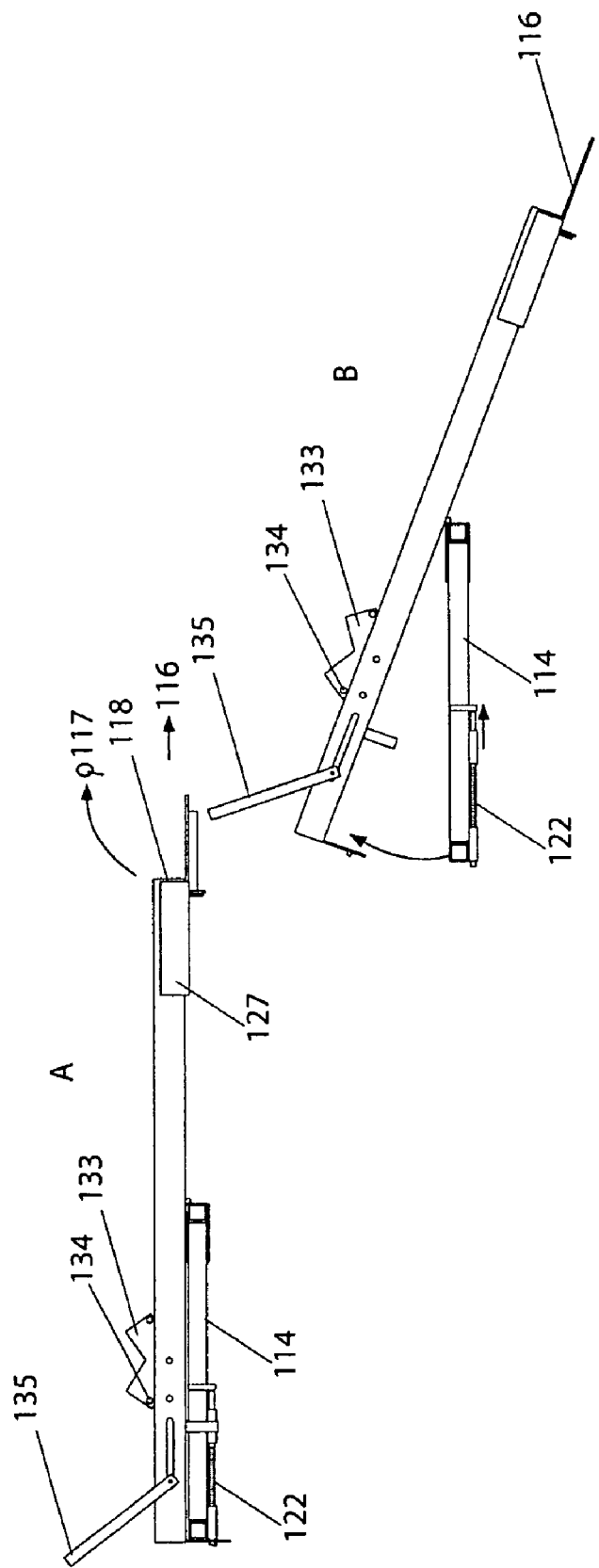
FIG. 6 shows the operation of the embodiment of the invention as shown in FIG. 5.

The embodiment shown in FIGS. 5 and 6 also includes a tie-down bar 132 located at the left end 107 of the carrying rack 101 and used to tie-down the auxiliary vehicle so that it will remain standing during transport.

The embodiment shown in FIGS. 5 and 6 also includes a wheel chock 133 that is attached to the carrying rack 101 between the rail 111 at the front 104 and rear 105 of the carrying rack 101. The chock 133 is attached in a manner that allows it to pivot toward or away from the opening 118. When loading an auxiliary vehicle, the chock 133 is rotated toward the opening 118. As the auxiliary vehicle is loaded the front wheel of the vehicle comes into contact with the chock 133 causing the chock 133 to rotate away from the opening 118 and behind the front wheel of the auxiliary vehicle. This embodiment also includes means 134 for locking the chock 133 in position behind the front wheel of the auxiliary vehicle to prevent the vehicle from rolling toward the opening 118. The preferred means 134 for locking the chock 133 is a pin that passes through a hole in the rail 111 and the chock 133.

The embodiment shown in FIGS. 5 and 6 also includes a wheel hoop 135 located at the left end 106 of the carrying rack 101. The hoop 135 is attached to the rail 111 in a manner that allows the hoop 135 to slide along the rail 111 toward and away from the opening 118. When loading a two-wheeled auxiliary vehicle, the front wheel of the vehicle is placed in the hoop 135 to provide additional stability for the vehicle during transportation.

The carrying rack 101 shown in FIGS. 5 and 6 is constructed using a light-weight material, preferably aluminum, with the following preferred sizes, weights, and capacities to accommodate different sizes of auxiliary vehicles and yet maintain the desired light weight of the hauling device 100:

| Size | Weight | Capacity |
| --- | --- | --- |
| Width 6 inches Length 60 inches | Less than 52 pounds | Up to 200 pounds |
| Width 6 inches Length 72 inches | Less than 65 pounds | Up to 400 pounds |
| Width 8 inches Length 84 inches | Less than 75 pounds | Up to 600 pounds |

The size refers to the usable size of the platform 109 with the width being the distance from the front 104 to the rear 105 and the length being the distance from the left end 106 to the right end 107. The weight refers to the weight of the hauling device 100. The capacity refers to the maximum weight of the auxiliary vehicle being transported using the hauling device 100.

Figure 7:
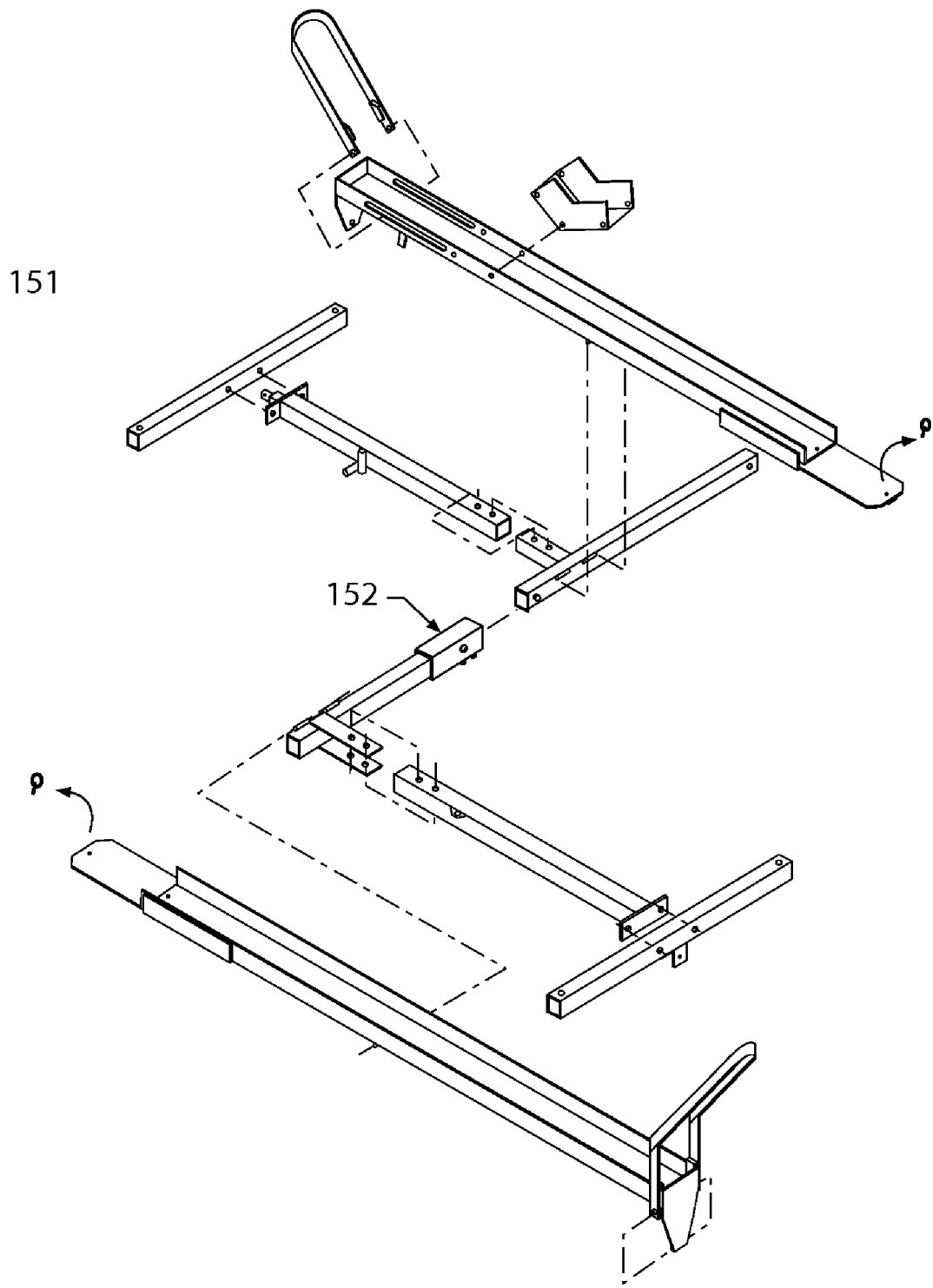
FIG. 7 is a perspective view of the embodiment of FIG. 5 adapted to transport a plurality of two-wheeled vehicles.

FIG. 7 shows an embodiment that includes a first tiltable hauling device 150 for transporting a two-wheel, auxiliary vehicle as disclosed in FIGS. 5 and 6, and a second tiltable hauling device 151 for transporting a second two-wheel, auxiliary vehicle as disclosed in FIGS. 5 and 6. The main frame 113 to the first tiltable hauling device 150 is connected to the main frame 113 to the second tiltable hauling device 151 using a receiver 152. In such an embodiment, the first tiltable hauling device 150 would tilt to the right and the second tiltable hauling device 151 would tilt to the left.

Changes may be made to the foregoing apparatus and devices without departing from the scope of the present invention. It should be noted that the matter contained in above description and/or shown in the accompanying drawings should be interpreted as illustrative and not in a limiting sense. The following claim(s) are intended to cover all generic and specific features described herein as well as statements of the scope of the present invention, which, as a matter of language, might be said to fall there between.

What is claimed is:

1. A tiltable hauling device 100 for transporting a two-wheel, auxiliary vehicle, comprising:

a carrying rack 101 with a top 102, bottom 103, front 104, rear 105, left end 106 and right end 107;
    wherein the width of the carrying rack 101 from the front 104 to the rear 105 is sufficient to accommodate a two-wheel auxiliary vehicle;
the top 102 of said carrying rack 101 comprises a generally planar platform 109 of solid, light-weight material;
a rail 111 extending above the platform 109 and along one of the left end 106 or right end 107 of the carrying rack 101 and along the front 104 and rear 105 of the carrying rack 101;
    wherein said rail 111 forms an opening 118 at one of the left end 106 or right end 107 of the carrying rack 101 for loading and unloading said auxiliary vehicle;
an outrigger 112 that comprises a main frame 113 and a level control arm 114;
    wherein the main frame 113 extends below the bottom 103 of the carrying rack 101 and in a direction that is substantially perpendicular to the front 104 and rear 105 of the carrying rack 101; and
    wherein the main frame 113 is connected to the bottom 103 of the carrying rack 101 by at least one hinge 120 located near the center line between the left end 106 and right end 107 of the carrying rack 101, allowing the carrying rack 101 to pivot at the hinge 120 so that the opening 118 will tilt downward into a loading position;
    wherein the level control arm 114 extends perpendicular from the main frame 113 to the end opposite the opening 118, and extends below the bottom 103 of the carrying rack 101 allowing the bottom 103 of the carrying rack 101 to rest upon the level control arm 114 when in a transport position;
means for locking 119 the carrying rack 101 to the level control arm 114 when the carrying rack 101 is in the transport position;
a hitch bar for mounting the hauling device 100 onto a transporting vehicle;
a loading deck 116 located below the carrying rack 101 and above the outrigger 112;
    wherein the loading deck 116 slides into a channel 127 located along the bottom 103 of the carrying rack 101; and
    wherein the loading deck 116 slides outward from the opening 118 to extend the platform 109 during loading and unloading of an auxiliary vehicle;
means 117 for locking the loading deck 116 in a retracted position for transporting a vehicle;
a tie-down bar 132 located at the left end 107 of the carrying rack 101 and used to tie-down the auxiliary vehicle during transport;
a wheel chock 133 attached to the carrying rack 101 between the rail 111 at the front 104 and rear 105;
    wherein the chock 133 is attached in a manner that allows it to pivot toward or away from the opening 118;
    means 134 for locking the chock 133 in position behind the front wheel of the auxiliary vehicle and rotated away from said opening 118 to prevent the auxiliary vehicle from rolling toward the opening 118;

a wheel hoop 135 located at the left end 106 of the carrying rack 101;

wherein said wheel hoop 135 is attached to the rail 111 in a manner that allows the wheel hoop 135 to slide along the rail 111 toward and away from the opening 118.

2. A tiltable hauling device 100 for transporting an auxiliary vehicle as described in claim 1, wherein the apparatus is generally made from aluminum.

3. A tiltable hauling device 100 for transporting an auxiliary vehicle as described in claim 1, wherein platform 109 and the rail 111 are formed from a single piece of extruded aluminum.

4. A tiltable hauling device 100 for transporting an auxiliary vehicle as described in claim 1, wherein the hauling device 100 weighs less than 75 pounds and can transport an auxiliary vehicle weighing up to 600 pounds.

* * * * *